United States Patent [19]
Patel

[11] Patent Number: 5,857,029
[45] Date of Patent: Jan. 5, 1999

[54] METHOD AND APPARATUS FOR NON-CONTACT SIGNATURE IMAGING

[75] Inventor: Mark A. Patel, Norwalk, Conn.

[73] Assignee: United Parcel Service Of America, Inc., Danbury, Conn.

[21] Appl. No.: 463,746

[22] Filed: Jun. 5, 1995

[51] Int. Cl.[6] .............................. G06K 9/00; G06K 9/48
[52] U.S. Cl. ..................... 382/119; 382/123; 382/198
[58] Field of Search .................................. 382/119, 123, 382/197, 198, 199, 258, 118, 242, 273, 137, 172, 245

[56] References Cited

U.S. PATENT DOCUMENTS

| | | | |
|---|---|---|---|
| 4,020,463 | 4/1977 | Himmel | 382/118 |
| 4,286,255 | 8/1981 | Siy | 382/123 |
| 4,562,592 | 12/1985 | Chainer et al. | 382/120 |
| 4,776,464 | 10/1988 | Miller et al. | 382/182 |
| 4,855,842 | 8/1989 | Hayes et al. | 386/125 |
| 5,050,223 | 9/1991 | Sumi | 382/266 |
| 5,054,102 | 10/1991 | Gaborski | 382/258 |
| 5,103,489 | 4/1992 | Miette | 382/101 |
| 5,120,940 | 6/1992 | Willsie | 382/173 |
| 5,199,081 | 3/1993 | Saito et al. | 382/116 |
| 5,237,625 | 8/1993 | Yamashita et al. | 382/266 |
| 5,296,960 | 3/1994 | Chandler et al. | 382/289 |
| 5,378,883 | 1/1995 | Batterman et al. | 235/472 |

FOREIGN PATENT DOCUMENTS 0392 159 2/1990 European Pat. Off. .

OTHER PUBLICATIONS

Sukhan et al., "Offline Tracing and Representation of Signatures," *IEEE Transactions on Systems, Man, and Cybernetics,* vol. 22, No. 4, pp. 755–771 (Jul. 1992).

Wilkinson et al., "Use of Synthetic Discriminant Functions for Handwritten–Signature Verification," *Applied Optics,* vol. 30, No. 23, pp. 3345–3353 Aug. (1991).

Rafael C. Gonzalez and Richard E. Woods, *Digital Image Processing,* 1992, Addison–Wesley Publishing Company, Inc., pp. 416–425, 452–456.

R. C. Gonzalez and R. E. Woods, Digital Image Processing, 1992, Addison–Wesley, pp. 199–201.

*Primary Examiner*—David K. Moore
*Assistant Examiner*—Wenpeng Chen
*Attorney, Agent, or Firm*—Jones & Askew, LLP; Michael J. Mehrman; John R. Harris

[57] ABSTRACT

A portable, hand-held apparatus for capturing a gray scale image of a signature within a box having fiducial marks in the corners. Portions of the image outside the box are trimmed away and the box is oriented and scaled to a standard size and shape. Signature storage requirements are minimized and signature recognition is facilitated by thresholding the gray scale image and thinning the strokes of the signature to an image width of one pixel.

18 Claims, 5 Drawing Sheets

| 000 | 001 | 111 | 000 | 110 | 110 | 100 | 000 | 011 | 111 | 000 | 110 |
| 0X0 | 0X1 | 0X1 | 0X1 | 0X1 | 1X1 | 1X0 | 1X1 | 1X0 | 1X1 | 1X1 | 1X0 |
| 000 | 001 | 010 | 110 | 111 | 000 | 010 | 011 | 100 | 101 | 110 | 111 |
| 111 | 011 | 000 | 001 | 001 | 011 | 110 | 100 | 111 | 000 | 100 | 011 |
| 0X0 | 0X1 | 0X1 | 0X1 | 0X1 | 1X1 | 1X0 | 1X1 | 1X0 | 1X0 | 1X1 | 1X0 |
| 000 | 001 | 011 | 110 | 111 | 000 | 010 | 011 | 100 | 110 | 110 | 111 |
| 010 | 111 | 010 | 011 | 011 | 111 | 111 | 001 | 110 | 100 | 001 | 111 |
| 0X1 | 0X1 | 0X1 | 0X1 | 0X1 | 1X1 | 1X0 | 1X1 | 1X1 | 1X0 | 1X1 | 1X0 |
| 000 | 001 | 011 | 110 | 111 | 000 | 010 | 011 | 100 | 110 | 110 | 111 |
| 110 | 000 | 110 | 111 | 111 | 110 | 000 | 101 | 011 | 010 | 101 | 000 |
| 0X1 | 0X1 | 0X1 | 0X1 | 0X1 | 1X1 | 1X0 | 1X1 | 1X1 | 1X0 | 1X1 | 1X1 |
| 000 | 010 | 011 | 110 | 111 | 001 | 011 | 011 | 100 | 110 | 110 | 111 |
| 011 | 110 | 001 | 000 | 110 | 011 | 100 | 100 | 111 | 110 | 000 | 100 |
| 0X1 | 0X1 | 0X1 | 0X0 | 1X0 | 1X1 | 1X0 | 1X0 | 1X1 | 1X0 | 1X0 | 1X1 |
| 000 | 010 | 011 | 111 | 000 | 001 | 011 | 100 | 100 | 110 | 111 | 111 |
| 111 | 001 | 011 | 000 | 011 | 111 | 110 | 010 | 110 | 011 | 100 | 001 |
| 0X1 | 0X1 | 0X1 | 0X1 | 1X0 | 1X1 | 1X0 | 1X0 | 1X1 | 1X0 | 1X0 | 1X1 |
| 000 | 010 | 011 | 111 | 000 | 001 | 011 | 100 | 101 | 110 | 111 | 111 |
| 110 | 011 | 111 | 010 | 111 | 000 | 111 | 110 | 011 | 111 | 010 | 101 |
| 0X1 | 0X1 | 0X1 | 0X1 | 1X0 | 1X0 | 1X0 | 1X0 | 1X1 | 1X0 | 1X0 | 1X1 |
| 001 | 010 | 011 | 111 | 000 | 010 | 011 | 100 | 101 | 110 | 111 | 111 |

METHOD AND APPARATUS FOR NON-CONTACT SIGNATURE IMAGING

FIELD OF INVENTION

The present invention relates generally to signature capture and more particularly to signature capture from a video image of a signature.

BACKGROUND OF THE INVENTION

Many transactions are authorized, verified, or acknowledged by signature of a person involved in the transaction. In many situations it has become important to capture the signature at the time it is written and to transmit a representation of the signature to a remote site to verify the authenticity of the signature. In other situations, capture of the signature and storage, or transmission to a remote site, is important for record keeping. In an attempt to meet the requirements of real time signature capture, many methods and devices have been used. Typically, the approach in the past has been to use special signature pads which are pressure sensitive or sensitive to magnetic or electrical fields generated when used with special pens. Frequently, the special pens are tethered to or near the special signature pads, making their use awkward for the general public. In addition, the special signature pads are awkward to integrate with existing equipment and existing techniques of acquiring authorizing or acknowledging signatures.

Special pens and special signature pads are prone to damage from the abuse received under typical conditions of use. As a result, most methods and devices for real time capture of signatures are plagued with poor reliability. Furthermore, the use of special electronic pens has been poorly received by the general public. The fact that the special pen and special signature pad must be used by the general public increases the likelihood of damage. In portable equipment, the integration of a special signature pad in the portable equipment generally means that the equipment must be given over to the person signing. This is yet a further drawback, in that the portable equipment can be dropped and damaged, and, in addition, the operator or attendant of the equipment is prevented from completing other tasks with the portable equipment while the signature is being obtained.

In many instances, such as in package delivery services, the need exists to obtain many signatures and to retain the signatures until the opportunity arises to transfer the stored signature data to a more permanent repository. Thus, the need exists for signature capture and storage for a relatively large number (on the order of hundreds) of signatures in a portable device.

Thus, a need exists for a reliable and efficient device which is capable of capturing and storing a plurality of signatures which are made with standard writing instruments on arbitrary writing surfaces.

SUMMARY OF THE INVENTION

The present invention overcomes the problems with prior devices and techniques by use of solid state video technology, preferably a charge couple device (CCD) camera. Such cameras typically produce a gray scale image of a scene. The present invention enables the use of a hand-held CCD camera for portable operations, and is particularly suited for use in a portable, dedicated signature capture unit. Because portable cameras may produce images which are skewed and have no pre-aligned orientation or registration, the invention preferably provides a signature box on the writing surface. The signature box facilitates the detection and processing of the portion of the image containing the signature. The signature box preferably is defined by four fiducial marks, one in each corner of the box. The presence of the box enables the invention to select and trim the portion of the image containing the signature. Since the initial image may be of any size and orientation, the invention may also scale and re-orient the gray scale image to place it in a previously-selected standard size and orientation.

A gray scale image requires a relatively large amount of storage. Trimming the image to contain only the signature box reduces the storage required. To reduce the signature storage requirements further, the invention thresholds the gray scale image so that the picture elements (pixels) corresponding to the signature portion of the image are set to a preselected value representing black, preferably 1, and the pixel values for the remainder of the image are set to another preselected value representing white, preferably 0. Additional storage reductions may be obtained by thinning the thresholded image of the signature, so that the strokes of the signature are only one pixel wide. Representations of the strokes may also be stored in a compressed form, such as vector representation or run length encoded ("RLE") form.

Preferably, the signature capture device has no moving parts, consisting only of a CCD camera, control electronics, a processor and storage. In a preferred embodiment, the elements of the invention can be installed in a hand-held portable device. Captured signatures may be stored in the device or may be transmitted to a remote location for verification or recording.

The CCD or other video camera is used to acquire a digital image of a signature, where the digital image is comprised of a plurality of rows of pixels and a plurality of columns of pixels. The location in the digital image corresponding to the ith column of the plurality of pixels and the jth row of the plurality of pixels is denoted by location [i,j]. The gray scale value of the pixel at location [i,j] is denoted by P[i,j]. In the area of the image containing the signature, a number of directional second derivatives of P[i,j] are computed, then the directional second derivative with the largest absolute magnitude is selected. If the selected second derivative is positive for location [i,j] in the gray scale image, the pixel in the corresponding location in the thresholded image is set to a preselected value representing black, preferably 1. Otherwise, it is set to another preselected value representing white, preferably 0.

The preferred directions of the directional second derivatives are along the direction of a row, along the direction of a column, and the diagonals of a box, the sides of which are oriented along the rows and columns. In these directions, the derivatives may be computed according to the following formulae:

| | |
|---|---|
| P[i−1, j]−2 P[i,j]+P[i+1, j] | (a) |
| P[i, j−1]−2 P[i,j]+P[i, j+1] | (b) |
| P[i−1, j−1]−2 P[i,j]+P[i+1, j+1] | (c) |
| P[i+1, j−1]−2 P[i,j]+P[i−1, j+1] | (d) |

After the signature is thresholded, the binary image may be thinned to yield a representation of the signature which is one pixel wide, corresponding to the path of the pen. A Medial Axis Transform ("MAT"), such as that described in *Practical Image Processing* by R. Lewis (Ellis Horwood, 1990) and which is incorporated herein by reference, may be applied to the binary image, and 3×3 thinning masks may be applied to each black pixel in order of increasing MAT value. Finally, the thinned image is compressed using either commercial techniques for vector representation of the signature strokes, such as those supplied by Roadnet Technologies, or by RLE representation.

Thus it is an object of the invention to provide an apparatus and method which is reliable and efficient and which is capable of capturing and storing a plurality of signatures made with standard writing instruments on a standard writing surfaces.

It is a further object of the invention to provide an apparatus and method to capture any signature made with a dark pen with a medium or wide tip.

It is a further object of the invention to provide a method of signature capture that is contained entirely within portable equipment, which contains no moving parts and requires no contact with the writing surface.

The present invention meets these objects and overcomes the drawbacks of the prior art, as will be apparent from the detailed description of the embodiments that follow.

BRIEF DESCRIPTION OF THE DRAWINGS

FIG. 5B is the set of "conditionally delete" thinning masks for use with the invention.

FIG. 5C is the set of "leave" thinning masks for use with the invention.

DETAILED DESCRIPTION OF THE PREFERRED EMBODIMENT

Figure 1:
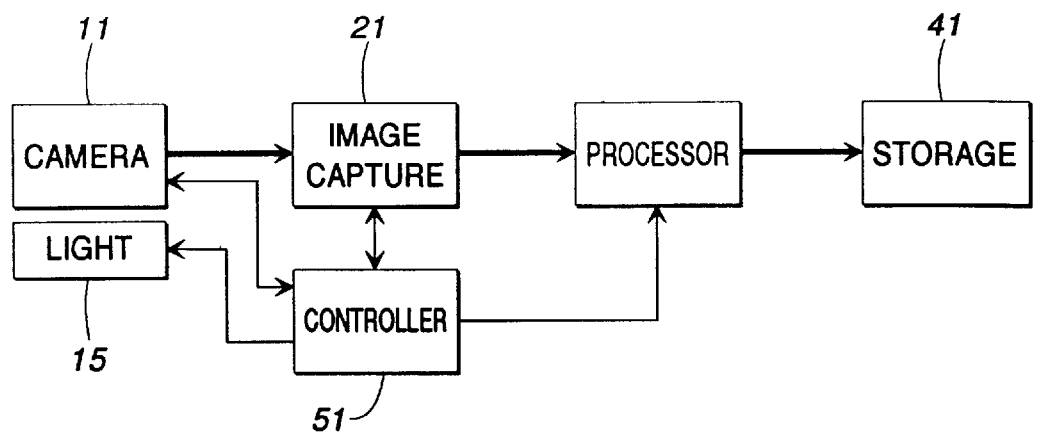
FIG. 1 is a block diagram of the major components of an embodiment of the present invention.

The major components of the invention are a CCD camera 11, an image capture module 21, a processor 31, a storage device 41, and a controller 51. The controller may have a keyboard (not shown) to facilitate operation of the invention. The camera can be any type of miniature CCD camera, for example a Sony CCB-M35 miniature card camera, fitted with a Sony CCL-M05XE 5 mm lens. As supplied by the manufacturer, the camera is equipped with a variable iris with a miniature adjusting motor. To eliminate the moving parts, the adjustable iris unit can be removed and replaced with a fixed iris. It is helpful to include a red filter (not shown) for the camera, combined with a red illumination source 15, to reduce the effects of external light. The combination of filter and illumination source 15 is especially useful in reducing the flicker caused by fluorescent lighting. The filter may be of optical glass deposited with a short pass multilayer dielectric filter, having a band pass characteristic from 640 nm to 720 nm. The filter may be mounted directly behind the iris to minimize image distortion.

Figures 4, 5A:
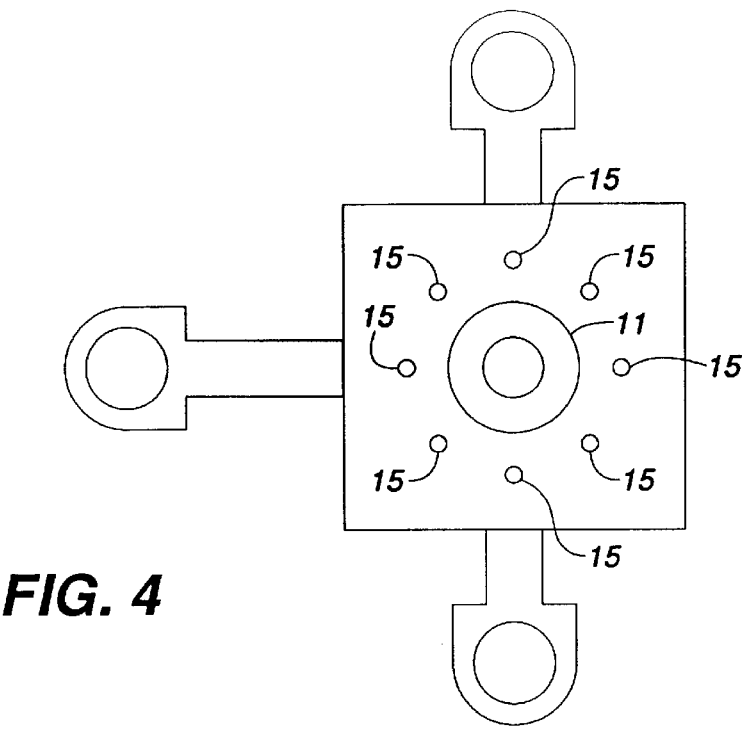
FIG. 4 is a diagram of the camera assembly for an embodiment of the present invention.
FIG. 5A is the set of "delete" thinning masks for use with the invention.

Illumination is provided by red LEDs with a peak emission wavelength of 660 nanometers. A total of eight LEDs may be mounted around the camera lens and adjusted to approximate a cone of light. To reduce power consumption, the LEDs may be strobed by the camera shutter, so that they are switched on only during the integration period as a frame of the CCD image is being captured. The strobing of the LEDs may be accomplished by using the camera's substrate electrode voltage to drive a one shot circuit. The complete camera assembly with lens, LEDs and mounting bracket is shown in FIG. 4.

The Sony CCB-M35 CCD card camera 11 utilizes a one/third inch interline transfer CCD. The device has a resolution of 510×492 pixels, and is designed for interlaced operation. The unit generates NTSC composite video, operating at 30 frames per second. Using three digital inputs, the integration period of the camera can be varied from 16.6 milliseconds to 0.1 milliseconds in 3 dB increments. Based on the motions of a typical user, the integration period should not be longer than four milliseconds to avoid significant motion blur.

The camera 11, LED illumination source 15 and keyboard are integrated with the control unit 51. The control unit permits the processor 31 to control the system's power, provides a regulated 5 volt supply to the camera, drives the LEDs using the integration period as a strobe, monitors the camera output and adjusts the integration period accordingly, returns an acknowledgment to the processor once the camera has reached a stable condition and is ready for use, and monitors and reads control keys, if a keypad is provided for the control unit.

A conventional image capture module (circuit board) 21 may be used to obtain each gray scale image frame from the camera, such as the Super Video Input Adapter manufactured by Jovian Logic Corporation. This board provides 640 rows and 480 columns of pixels, each having a six bit gray scale.

Signature image processing techniques. Capturing a frame of video and storing it in digital form is a valid method of signature capture; however, it would require over 90 kilobytes of storage space for just one signature. Clearly, such a method is unsuitable for a portable device with limited memory capacity. Therefore, image processing is used to extract the signature information in the captured frame. Preferably, this information may be stored as a series of vectors, representing the path of the pen.

There are three main areas in which image processing can be used to reduce the amount of data. First, the signature will not cover the entire frame, thereby making the surrounding areas unimportant. In some cases, the resolution of the signature will be greater than needed, offering further opportunity for data reduction.

The captured frame is also a gray scale image, with each pixel capable of having a range of values. However, for a signature, it is only necessary to know if a pixel is black or white. Therefore, the image can be thresholded to reduce the shading information.

Finally, a signature has several geometric and topological characteristics which can be used to reduce the amount of storage space needed. For example, it contains large areas of white pixels, and most black pixels are part of a line.

Figure 2:
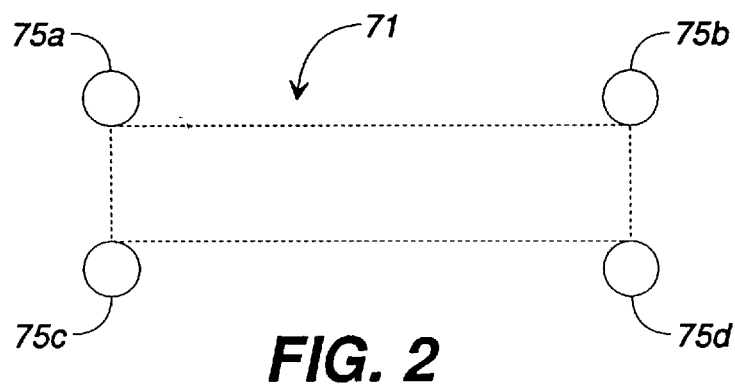
FIG. 2 is a representation of a preferred signature box used to record a signature to be captured by the invention.
Figure 3:
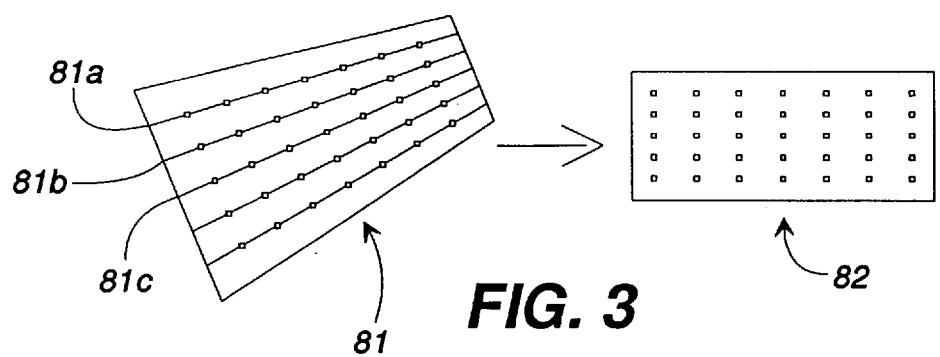
FIG. 3 is a representation of an example transformation performed to orient and scale the signature box of FIG. 2.

The key factor in trimming excess image area is successfully locating the signature. To aid in this process, special markers 75a, 75b, 75c, and 75d can be placed on the label, as shown in FIG. 2. Since the labels are printed consistently, the positions of the corners of the signature box 71 can be precisely interpolated from the locations of these markers 75a, 75b, 75c, and 75d. The signature can then be mapped to an image of a standard size and shape, which simplifies subsequent processes. The mapping process uses simple linear algebra, known to those skilled in the art, to reference pixels in the captured image to a normalized image of standard dimensions. A number of points 81a, 81b, and 81c, corresponding to the desired vertical resolution of the normalized image, are evenly distributed along the sides of the signature box in the image. Segments are then drawn across the signature between corresponding points, as shown in FIG. 3.

Upon these segments, a number of sample points are evenly distributed, corresponding to the horizontal resolution of the normalized image. The values of the pixels at each of these sample points are transferred to the normalized image 82.

As an example of the mapping which can be used to place the signature image in a standard size and shape, consider a signature box which has marker 75a (upper left) located at pixel position $[a_1,b_1]$, 75b (upper right) located at pixel position $[a_2,b_2]$, 75d (lower right) located at pixel position $[a_3,b_3]$, and 75c (lower left) located at pixel position $[a_4,b_4]$. The desired size of the standard image is W columns wide and H rows high. Each pixel in the standard image located at [w,h] is assigned the same value as P[i,j], where [i,j] is the location of a pixel in the original captured image given by $$i = x_L + ((x_R - x_L)(w/W))$$

$$i = y_L + ((y_R - y_L)(w/W))$$

where $[x_L, y_L]$ and $[x_R, y_R]$ are the locations of the left and right segment endpoints, given by $$x_L = a_1 + ((a_4 - a_1)(h/H))$$

$$y_L = b_1 + ((b_4 - b_1)(h/H))$$

$$x_R = a_2 + ((a_3 - a_2)(h/H))$$

$$y_R = b_2 + ((b_3 - b_2)(h/H))$$

This method is not exact, since the points on each segment are equally spaced even if one side of the box is closer, and consequently larger, than the other. However, unless extreme angles are involved, the error created is small and the effects should not be noticeable.

The act of thresholding a gray scale image determines whether a pixel is black or white. The most basic form of thresholding simply compares each pixel value to a constant; if the pixel value is larger, then it is considered white, otherwise it is considered black. However, variations in illumination intensity or object distance can vary the pixel values, thereby reducing the performance of a fixed threshold.

A more sophisticated method uses the average values in a small area as the threshold level. This method is much more robust than a fixed threshold. However, it assumes that within the averaging area, an equal number of black and white pixels will exist. An unusually large number of white or black pixels in the area will cause the threshold to deviate considerably from its optimum value.

Since a signature is composed of lines, this information can be used to devise a more effective thresholding algorithm. To eliminate the effects of any offset, a discrete second derivative is taken in four directions. For a pixel at coordinates [i,j] with a value of P[i,j] we define the directional second derivatives $D_1$, $D_2$, $D_3$, and $D_4$ as follows:

$D_1 = P[i-1, j] - 2P[i,j] + P[i+1, j]$
$D_2 = P[i, j-1] - 2 P[i,j] + P[i, j+1]$
$D_3 = P[i-1, j-1] - 2 P[i,j] + P[i+1, j+1]$
$D_4 = P[i+1, j-1] - 2 P[i,j] + P[i-1, j+1]$ $D_1$ and $D_2$ are the discrete column and row second derivatives, respectively, and $D_3$ and $D_4$ are the discrete diagonal derivatives. These four values are then checked to determine the one with the largest absolute value; if that value is positive, then the pixel is considered black. Otherwise, the pixel is considered white.

While the size of normalized and thresholded image data is much smaller than that of the original frame, it is still quite large. A 250×50 pixel binary image still requires over 1.5 kilobytes of storage. The image should be compressed to increase the number of signature representations which may be stored in a given memory configuration.

One possible method for compression is run length encoding. This technique specifies a value, then the number of times it is repeated. For the large areas of white in a signature, this method is very effective in compressing the data. However, since it is performed using horizontal scan lines, it does not account for the omnidirectional nature of the black lines. Furthermore, the data format would be different from that currently generated by signature pads, thereby requiring software modifications for numerous applications. Certain situations may also require that the signature be captured as a series of pen movements in order to meet legal requirements.

To optimize the compression ratio, a vector coding sequence may be used. This is because a vector can point in any direction, like the signature lines which are being represented. It is because of this higher correlation that it is the most effective method of compression for signature data.

Each line in a signature can be specified by a starting point, where the pen made initial contact, and a series of vectors, describing the direction in which the pen was moved. However, in order to trace a signature in an image, it is preferable that it first be thinned.

Thinning erodes the black pixels in an image, leaving behind only a skeleton of the signature. This process is performed in two steps. First, the Medial Axis Transform (MAT) is applied to the image, which assigns to each black pixel its distance from the nearest white pixel. Then, in order of increasing MAT values, each black pixel and its 3×3 neighborhood are compared to a series of masks, which determine whether or not the black pixel can be removed, i. e., set to white. By definition, an image is thinned if no black pixel can be removed without changing the connectivity of an image. Typically, this means that the signature strokes are only one pixel wide. Thinning masks are shown in FIGS. 5A, 5B, and 5C.

In FIGS. 5A, 5B, and 5C, a black pixel is represented by 1 and a white pixel is represented by 0. This convention is used to simplify processing. The thinning masks are used to decide whether a black pixel should be removed (neighborhoods matching masks in FIG. 5A) or not (neighborhoods matching masks in FIG. 5C). For neighborhoods matching the masks in FIG. 5B, the black pixel is removed if one of its neighbors has a higher MAT value.

Having thinned the image, it can easily be converted to a vector format. Using a Huffman coding scheme developed by Roadnet Technologies, these vector sequences can be compressed to very compact files. Roadnet Technologies has developed 11 basic graphics commands which should be able to describe any arbitrary signature The thinned signature may be traced and represented using the set of 11 commands. The corresponding bit patterns are then stored, yielding a highly compressed signature image.

Redrawing the signature from the compressed file is easily performed using a binary tree and simple graphics routines.

Figure 6:
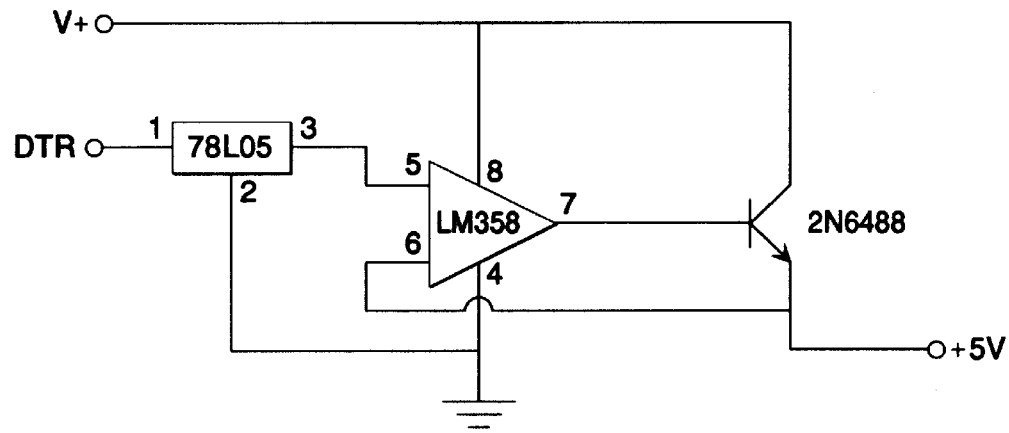
FIG. 6 is a circuit diagram for a controllable power regulator, for use with the invention.

Controller. A number of camera 11 and illumination source 15 control functions are implemented with electronic circuits in a controller 51. A linear voltage regulator, shown in FIG. 6, permits the processor to control the power supply to the camera. The regulator's voltage reference is powered by the DTR line from the processor 31 COM port. Hence, when the DTR is high, the voltage reference is at +5 volts and the output of the regulator matches it. However, when the DTR is set low, the voltage reference drops to 0 volts, thereby shutting down power to the camera.

Figure 7:
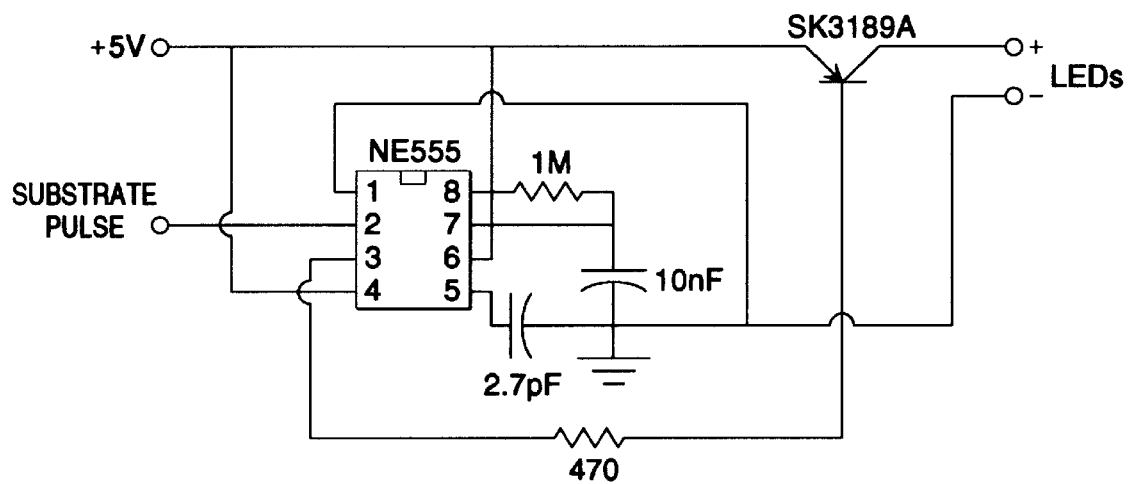
FIG. 7 is a circuit diagram for a circuit to control the operation of a LED light source, for use with the invention.

The integration period of the camera is used as a strobe to drive the illumination source 15 LEDs. As shown in FIG. 7, the substrate electrode signal is pulsed at the end of every line of camera data until the current field being clocked out is one integration period from the end. The pulses effectively empty the photoelements; hence, they do not accumulate charge until the pulses stop. One integration period later, the charges in the photoelements are transferred to the CCD cells, thereby ending the integration period.

The substrate pulses are applied to a one-shot multivibrator, with its period set slightly longer than one line scan. Hence, the output to the LEDs remains off until at least two lines have been scanned without a substrate pulse.

Figure 8:
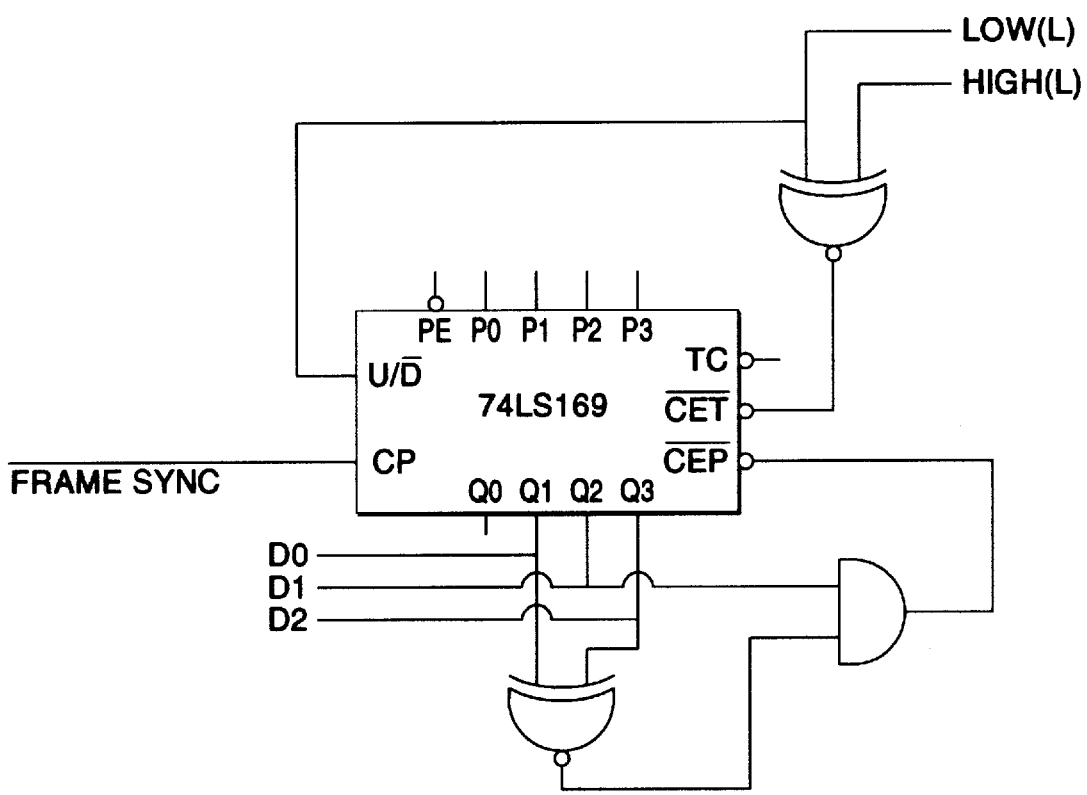
FIG. 8 is a circuit diagram for a circuit to control the camera integration period, for use with the invention.

As shown in FIG. 8, three digital inputs, D0–D2(L), are used to adjust the integration period of the camera. The shutter speed is determined by $$T = \frac{16.6}{2^D} \, ms$$

where D is the value of the three bit number D2 D1 D0. Hence, by incrementing D, the integration period of the camera is halved. The three inputs are connected to an up/down counter.

By monitoring the IRIS_OUT signal of the Sony camera, the output of the CCD can be monitored prior to the Automatic Gain Control. Two thresholds are set, representing the allowable range for the signal. The signal is first low-pass filtered, then compared to the two thresholds.

If the signal amplitude exceeds the upper threshold, then the integration time is reduced by incrementing the counter. If the signal amplitude is below the lower threshold, then the integration time is increased by decrementing the counter. The ratio of the two thresholds is slightly larger than 3 db, thereby preventing oscillations.

To ensure stability, the counter is clocked only on every other field sync pulse. This is necessary because at least one field must be captured before the changes to D will effect the output signal.

Combinational logic is used to prevent the counter from counting below the minimum integration period.

By monitoring the clocks on the counter, an acknowledge signal is asserted when the counter is stable. This condition indicates that the output of the CCD is within the acceptable range.

Control Keys. Using one row of the keyboard and three column conductors, three keys can be monitored. The row conductor is connected to (H), and the column conductors are connected to the CTS, DSR and RI inputs on the COM port. Pull down resistors are also connected to the three control lines. The three keys may be used, for example to request a signature capture, to ignore a signature, or to communicate with other modules in a system.

While this invention has been described in detail with particular reference to preferred embodiments thereof, it will be understood that variations and modifications can be made to these embodiments without departing from the spirit and scope of the invention as described herein and as defined in the appended claims.

I claim:

1. A method of representing a digital image of a signature, comprising the steps of (a) acquiring a gray scale digital image of said signature, wherein said digital image is comprised of a plurality of rows of pixels and a plurality of columns of pixels, the ith column of said plurality of pixels and the jth row of said plurality of pixels being denoted by location [i,j], and the gray scale value of the pixel at location [i,j] being denoted by P[i,j];

(b) computing, for at least one location [i,j] in a region of said digital image containing said signature, a plurality of directional second derivatives of P[i,j];

(c) selecting from among said second derivatives of P[i,j] the largest magnitude second derivative; and (d) constructing a thresholded digital image of said signature by assigning a first preselected value to a location corresponding to location [i,j] of said digital image if said largest magnitude second derivative is positive and by assigning a second preselected value if said largest magnitude second derivative is not positive.

2. The method of claim 1, wherein the directions of the derivatives are selected from among the set of directions along the row containing said location [i,j], along the column containing said location, and along each of two diagonals through said location [i,j].

3. The method of claim 1, wherein said directional second derivatives are computed from among the formula:

P[i−1, j]−2 P[i,j]+P[i+1, j];    (a)

P[i,j−1]−2 P[i,j]+P[i,j+1];    (b)

P[i−1, j−1]−2 P[i,j]+P[i+1, j+1];    (c)

and

P[i+1, j−1]−2 P[i,j]+P[i−1, j+1].    (d).

4. The method of claim 1, wherein said plurality of second derivatives numbers 4.

5. The method of claim 1, wherein said first preselected value is 1.

6. The method of claim 1, wherein said second preselected value is 0.

7. The method of claim 1, further comprising the step of thinning said thresholded digital image.

8. A method of obtaining a representation of a signature, comprising the steps of (a) obtaining said signature on a surface having fiducial markings;

(b) acquiring a gray scale first digital image of said signature and said fiducial markings;

(c) identifying a region of said first digital image containing said signature by locating said fiducial markings in said first digital image;

(d) using the locations of said fiducial markings to map said region containing said signature to a gray scale second digital image having a preselected size and orientation, wherein said second digital image is comprised of a plurality of rows of pixels and a plurality of columns of pixels, the ith column of said plurality of pixels and the jth row of said plurality of pixels being denoted by location [i,j], and the gray scale value of the pixel at location [i,j] being denoted by P[i,j];

(e) computing, for at least one location [i,j] in said second digital image, a plurality of directional second derivatives of P[i,j];

(f) selecting from among said second derivatives of P[i,j] the largest magnitude second derivative; and (g) constructing a thresholded digital image of said signature by assigning a first preselected value to a location corresponding to location [i,j] of said second digital image if said largest magnitude second derivative is positive and by assigning a second preselected value if said largest magnitude second derivative is not positive.

9. The method of claim 8, further comprising the step of thinning said thresholded digital image.

10. An apparatus for obtaining a representation of a signature, comprising (a) a surface having fiducial markings to delineate an area for placement of said signature;

(b) means for acquiring a gray scale first digital image of said signature and said fiducial markings;

(c) means for identifying a region of said first digital image containing said signature by locating said fiducial markings in said first digital image;

(d) means for using the locations of said fiducial markings to map said region containing said signature to a gray scale second digital image having a preselected size and orientation, wherein said second digital image is comprised of a plurality of rows of pixels and a plurality of columns of pixels, the ith column of said plurality of pixels and the jth row of said plurality of pixels being denoted by location [i,j], and the gray scale value of the pixel at location [i,j] being denoted by P[i,j];

(e) means for computing, for at least one location [i,j] in said second digital image, a plurality of directional second derivatives of P[i,j];

(f) means for selecting from among said second derivatives of P[i,j] the largest magnitude second derivative; and (g) means for constructing a thresholded digital image of said signature by assigning a first preselected value to a location corresponding to location [i,j] of said second digital image if said largest magnitude second derivative is positive and by assigning a second preselected value if said largest magnitude second derivative is not positive.

11. The apparatus of claim 10, further comprising a means for thinning the thresholded digital image to create a thinned binary image.

12. The apparatus of claim 11, further comprising:

means for compressing the thinned binary image to obtain a compressed representation of the signature; and a storage device coupled to the processor for storing the compressed representation of the signature.

13. An apparatus for creating a compressed representation of indicia printed on a surface, the surface including a plurality of fiducial marks, the indicia located within a region defined by the fiducial marks, comprising:

a light source for illuminating the surface;

a charged-coupled device array comprising a plurality of photoelements for accumulating electric charge in response to light reflected by the surface;

an image capture module coupled to the charged-coupled device array for receiving a discharge from the photoelements of the charged-coupled device array and creating a grey-scale digital image corresponding to the discharge comprising a plurality of rows of pixels and a plurality of columns of pixels, the ith column of the plurality of pixels and the jth row of the plurality of pixels being denoted by location [i,j], and the gray scale value of the pixel at location [i,j] being denoted by P[i,j];

a processor coupled to the image capture module for,
identifying the fiducial marks,
trimming the grey-scale digital image to a region defined by the fiducial marks to create a trimmed grey-scale image;
defining a binary image comprising a plurality of binary pixel values, each binary pixel value corresponding to one of the pixel values P[i,j] of the trimmed grey-scale image,
for each of a plurality of the pixel values P[i,j] of the trimmed grey-scale image,
computing a plurality of directional second derivatives of P[i,j];
selecting from among the second derivatives of P[i,j] the largest magnitude second derivative, and
assigning the corresponding binary pixel value a first preselected value if the largest magnitude second derivative is positive and by assigning the corresponding binary pixel value a second preselected value if the largest magnitude second derivative is not positive,
thinning the binary digital image, and
compressing the thinned binary image to obtain compressed representation of the indicia; and a storage device coupled to the processor for storing the compressed representation of the indicia.

14. The apparatus of claim 13, further comprising:

a battery coupled to the light source, the charged-coupled device array, the image capture module, the processor, and the storage device; and a controller coupled to the light source and the charged-couple device array for strobing the light source and discharging the array to the image capture device in synchronism so as to conserve energy stored within the battery while capturing the grey-scale digital image of the surface.

15. The apparatus of claim 13, wherein the directions of the derivatives are selected from among the set of directions along the row containing said location [i,j], along the column containing said location [i,j], and along each of two diagonals through said location [i,j].

16. The apparatus of claim 13, wherein said directional second derivatives are computed from among the formula:

$$P[i-1, j] - 2\ P[i,j] + P[i+1, j]; \quad (a)$$

$$P[i, j-1] - 2\ P[i,j] + P[i, j+1]; \quad (b)$$

$$P[i-1, j-1] - 2\ P[i,j] + P[i+1, j+1]; \quad (c)$$

and $$P[i+1, j-1] - 2\ P[i,j] + P[i-1, j+1]. \quad (d).$$

17. The apparatus of claim 13, wherein said plurality of second derivatives numbers 4.

18. The apparatus of claim 13 wherein said first preselected value is 1 and the second preselected value is 0.

* * * * *